United States Patent
Li et al.

(10) Patent No.: US 7,038,853 B2
(45) Date of Patent: May 2, 2006

(54) ATHERMALIZED PLASTIC LENS

(75) Inventors: Yajun Li, Oakdale, NY (US); Vladimir Gurevich, Stony Brook, NY (US); Mark Krichever, Hauppague, NY (US); Edward Barkan, Miller Place, NY (US); Miklos Stern, Woodmere, NY (US)

(73) Assignee: Symbol Technlogies, Inc., Holtsville, NY (US)

( * ) Notice: Subject to any disclaimer, the term of this patent is extended or adjusted under 35 U.S.C. 154(b) by 0 days.

(21) Appl. No.: 10/745,830

(22) Filed: Dec. 24, 2003

(65) Prior Publication Data
US 2004/0136069 A1 Jul. 15, 2004

Related U.S. Application Data

(60) Continuation of application No. 09/551,272, filed on Apr. 18, 2000, now abandoned, which is a continuation of application No. 09/109,018, filed on Jul. 1, 1998, now abandoned, which is a continuation-in-part of application No. 08/953,543, filed on Oct. 20, 1997, now abandoned, which is a continuation-in-part of application No. 08/624,935, filed on Mar. 22, 1996, now abandoned, which is a continuation-in-part of application No. 08/173,255, filed on Dec. 27, 1993, now abandoned, which is a division of application No. 07/860,390, filed on Mar. 30, 1992, now abandoned.

(51) Int. Cl.
*G02B 27/44* (2006.01)
(52) U.S. Cl. ............... 359/566; 359/569; 235/462.35; 235/462.22
(58) Field of Classification Search ............... 359/566, 359/569, 570, 721, 741, 742, 743
See application file for complete search history.

(56) References Cited

U.S. PATENT DOCUMENTS

| 2,759,393 | A | * | 8/1956 | Mcleod ................... 356/138 |
| 3,970,781 | A | | 7/1976 | Dalton et al. ............. 178/7.6 |
| 4,323,297 | A | | 4/1982 | Kawamura et al. ........ 359/206 |
| 4,563,056 | A | | 1/1986 | Tagawa et al. ............ 359/218 |
| 4,676,599 | A | | 6/1987 | Cruz ......................... 359/829 |
| 4,816,660 | A | | 3/1989 | Swartz et al. ........ 235/462.21 |
| 4,820,911 | A | | 4/1989 | Arackellian et al. .. 235/462.22 |
| 4,836,637 | A | | 6/1989 | Poorman et al. ........... 385/60 |
| 4,923,281 | A | | 5/1990 | Krichever et al. ......... 359/826 |
| 5,073,041 | A | | 12/1991 | Rastani ..................... 385/33 |
| 5,080,456 | A | | 1/1992 | Katz et al. ................ 359/214 |

(Continued)

FOREIGN PATENT DOCUMENTS

JP 60202401 10/1985

OTHER PUBLICATIONS

C. Londono, W. T. Plummer, P. P. Clark, 'Athermalization of a single-component lens with diffractive optics', Appl. Opt., vol. 32, No. 13, May 1, 1993, pp. 2295-2302.*

(Continued)

*Primary Examiner*—Thong Nguyen
*Assistant Examiner*—Armel C. Lavarias
(74) *Attorney, Agent, or Firm*—Watts Hoffmann Co., L.P.A.

(57) ABSTRACT

A plastic lens includes refractive and diffractive optical apparatus configured to produce optothermal changes substantially canceling each other over a predetermined working temperature range to render the plastic lens substantially athermalized over the range.

16 Claims, 11 Drawing Sheets

U.S. PATENT DOCUMENTS

| | | | |
|---|---|---|---|
| 5,144,120 A | 9/1992 | Krichever et al. | 235/462.35 |
| 5,151,823 A * | 9/1992 | Chen | 359/565 |
| 5,164,584 A | 11/1992 | Wike, Jr. et al. | 250/216 |
| 5,206,878 A | 4/1993 | Sizer, II | 372/101 |
| 5,247,162 A | 9/1993 | Swartz et al. | 235/462.35 |
| 5,260,828 A | 11/1993 | Londono et al. | 359/569 |
| 5,278,397 A * | 1/1994 | Barkan et al. | 235/462.49 |
| 5,315,095 A * | 5/1994 | Marom et al. | 235/462.22 |
| 5,331,143 A * | 7/1994 | Marom et al. | 235/462.38 |
| 5,386,105 A | 1/1995 | Quinn et al. | 235/462.22 |
| 5,422,472 A * | 6/1995 | Tavislan et al. | 235/472.01 |
| 5,438,187 A * | 8/1995 | Reddersen et al. | 235/462.22 |
| 5,504,350 A | 4/1996 | Ortyn | 257/81 |
| 5,504,628 A | 4/1996 | Borchard | 359/558 |
| 5,506,392 A * | 4/1996 | Barkan et al. | 235/462.46 |
| 5,523,809 A * | 6/1996 | Kohayakawa | 351/211 |
| 5,629,799 A * | 5/1997 | Maruyama et al. | 359/565 |
| 5,646,391 A | 7/1997 | Forbes et al. | 235/462.32 |
| 5,683,748 A | 11/1997 | Gunderson | 427/236 |
| 5,684,287 A | 11/1997 | Walts | 235/462.45 |
| 5,684,290 A | 11/1997 | Arackellian et al. | 235/462.42 |
| 5,691,847 A | 11/1997 | Chen | 359/565 |
| 5,706,139 A | 1/1998 | Kelly | 359/565 |
| 5,715,091 A | 2/1998 | Meyers | 359/565 |
| 5,734,502 A | 3/1998 | Ebstein | 359/565 |
| 5,737,120 A | 4/1998 | Arriola | 359/565 |
| 5,745,289 A | 4/1998 | Hamblen | 359/569 |
| 5,814,803 A * | 9/1998 | Olmstead et al. | 235/462.01 |
| 5,949,577 A | 9/1999 | Ogata | 359/565 |

OTHER PUBLICATIONS

Carts, "Micro-optics has macro potential," Laser Focus World, Jun. 1991.

Figiwara, "Optical properties of conic surfaces, " I Reflecting Cone, J. Opt. Soc. Am., 52, 287-292 (1962).

Goodman, Introduction to Fourier Optics, Table of Contents, pp. 110-120, first ed. 1968, second ed. 1996.

Johnson et al., "Connectorized Optical Link Package Incorporating a Microlens," Proceedings of the 30th Electronics Components Conference, San Francisco, CA, Apr. 28-30, 1980.

Tsi et al., "System analysis of CCD-based bar code readers," Appl. Opt., 32, 3504-3512 (1993).

Behrmann et al., "Influence of temperature on diffractive lens performance," Appl. Opt., 32, 2483-2489.

* cited by examiner

| CCD 10mil SYMBOLS | | | |
|---|---|---|---|
| z (INCH) | MTF1$_e$ | MTF2$_e$ | MTF3$_e$ |
| 2.662 | 0.2 | 0.15 | 0.05 |
| 3.669 | 0.35 | 0.25 | 0.15 |
| 5.264 | 0.55 | 0.42 | 0.28 |
| 6.725 | 0.62 | 0.44 | .035 |
| 9.309 | 0.54 | 0.5 | 0.4 |
| 11.523 | 0.38 | 0.4 | 0.38 |
| 15.118 | 0.2 | 0.25 | 0.28 |
| 21.974 | 0.03 | 0.04 | 0.06 |
| 24.618 | 0 | 0 | 0 |
| | $\alpha=-.0002$ | $\alpha=-.0003$ | $\alpha=-.0004$ |

| 20mil SYMBOLS | | | |
|---|---|---|---|
| z (INCH) | MTF1$_f$ | MTF2$_f$ | MTF3$_f$ |
| 2.662 | .078 | 0.65 | 0.6 |
| 3.669 | 0.77 | 0.7 | 0.64 |
| 5.264 | 0.8 | 0.72 | 0.67 |
| 6.725 | 0.8 | 0.75 | 0.7 |
| 9.309 | 0.69 | 0.74 | 0.75 |
| 11.523 | 0.67 | 0.7 | 0.67 |
| 15.118 | 0.66 | 0.56 | 0.58 |
| 21.974 | 0.27 | 0.35 | 0.43 |
| 40.208 | 0.07 | 0.02 | 0.09 |
| 49.236 | 0 | 0 | 0 |
| | $\alpha=-.0002$ | $\alpha=-.0003$ | $\alpha=-.0004$ |

$\alpha = +0.001$

_US 7,038,853 B2_

ATHERMALIZED PLASTIC LENS

CROSS REFERENCE TO RELATED APPLICATIONS

This application is a continuation of U.S. application Ser. No. 09/551,272, filed Apr. 18, 2000, now abandoned which is a continuation of U.S. application Ser. No. 09/109,018, filed Jul. 1, 1998, now abandoned which is a continuation-in-part of U.S. application Ser. No. 08/953,543, filed Oct. 20, 1997, now abandoned which is a continuation-in-part of U.S. application Ser. No. 08/624,935, filed Mar. 22, 1996, now abandoned which is a continuation-in-part of U.S. application Ser. No. 08/173,255, filed Dec. 27, 1993, now abandoned which is a divisional of U.S. application Ser. No. 07/860,390, filed Mar. 30, 1992 now abandoned. The six aforementioned applications are incorporated by reference herein in their entirety.

BACKGROUND OF THE INVENTION

The invention relates to an athermalized plastic lens.

In a system (e.g., a bar code scanner) that relies on a specific optical property (e.g., a specific focal length) of a lens, changes in temperature that affect the specific optical property of the lens can cause the system to function improperly or inaccurately. For example, if the lens is used in a bar code scanner to focus light reflected from a bar code symbol onto a CCD device that produces an image of the symbol, the produced image may be too out-of-focus to be effectively decoded if the focal length of the lens is affected significantly by a temperature change. Typically, a glass lens is more resistant to temperature changes than a plastic lens having the same shape.

SUMMARY OF THE INVENTION

The invention provides an athermalized plastic lens in which optothermal changes are balanced by refractive and diffractive optics, allowing the lens to achieve thermal performance characteristics similar to those of a glass lens, while being inexpensive, lightweight, and easily shaped. When the lens includes an axicon, the lens provides equipment such as bar code scanners with an extended working range.

Preferred implementations of the invention may include one or more of the following. The lens may include a refractive surface and a diffractive optical element, wherein optothermal changes due to the refractive surface counter optothermal changes due to the diffractive optical element. The optothermal changes may cancel each other and include changes affecting the focal length of the lens. The lens may include polycarbonate. The lens may include acrylic. The lens may include a net positive power. The optothermal expansion coefficient of the refractive optical apparatus may be higher than an optothermal expansion coefficient of the diffractive optical apparatus. The lens may include a diffractive optical element that is substantially smaller than the lens. The first surface of the lens may provide substantially all of the negative power of the lens, and the second surface of the lens may provide substantially all of the positive power of the lens. The surface of the lens may provide substantially all of the negative power of the lens and substantially all of the positive power of the lens. The diffractive optical apparatus may include a diffractive optical element that is substantially spherical in average. The surface of the lens may be substantially flat. The refractive optical apparatus may be divided unevenly between first and second surfaces of the lens. Substantially all of the diffractive optical apparatus may be disposed on one surface of the lens. The diffractive optical apparatus may be divided substantially evenly between first and second surfaces of the lens. The lens may include an axicon. The axicon may include a polymer. The axicon may be disposed at a substantially spherical surface of the lens. The diffractive optical element and the axicon may be disposed at different surfaces of the lens. The lens may include a diffractive optical element that includes at least eight phase levels. The lens may include a diffractive optical element that includes fewer than nine phase levels. The axicon may be affixed to a surface of the lens. The lens may include an aspherical surface having the optical properties of a combination of a spherical surface with the axicon. The lens may include a doublet. The lens may include a Cook triplet anastigmat. The lens may include a symmetric double Gaussian. The MTF of the lens may be higher with the axicon than without the axicon for bar code symbols having spatial wavelengths of 10–20 mils, inclusive. The MTF of the lens may be at least 0.2 for a 10 mil bar code symbol that is from about 4 to about 16 inches away from the lens.

Other advantages and features will become apparent from the following description and from the claims.

DESCRIPTION OF THE PREFERRED EMBODIMENTS

Figure 1:
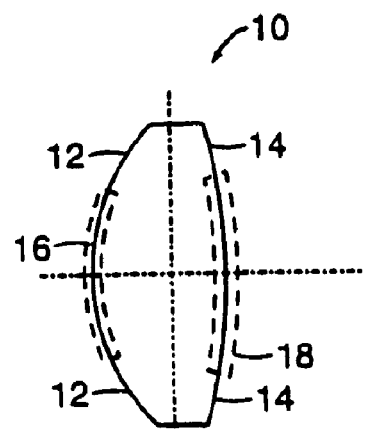
FIG. 1 is an illustration of an embodiment of an athermalized plastic lens having refractive surfaces and diffractive optical elements.

FIG. 1 illustrates a lens 10 that is an embodiment of an athermalized plastic hybrid lens ("hybrid lens") that includes refractive and diffractive optics. As described below, by balancing changes in optical properties resulting from temperature-induced expansion or contraction of lens material ("optothermal changes"), the hybrid lens achieves thermal performance characteristics similar to those of a glass lens, while being inexpensive, lightweight, and easy to shape. The balancing is accomplished by special properties of surfaces and elements of the hybrid lens (e.g., spherical refractive surfaces 12, 14 and diffractive optical elements ("DOEs") 16, 18 of lens 10), as described below.

In at least some cases, the optothermal changes resulting from a temperature change produce a focal length difference. For a particular lens, the nature of the relationship between the temperature change and the focal length difference depends on the characteristics of the lens. In an athermalized lens, the temperature change produces no significant focal length difference, i.e., the Focal length of an athermalized lens is not significantly affected by temperature changes.

Lens 10 has a focal length f that includes the following components that are related as described in equation (1) below: a refractive focal length $f_r$ due to the refractive surfaces 12, 14 which have focal lengths $f_{r1}$ and $f_{r2}$, respectively, and a diffractive focal length $f_d$ due to the DOEs 16, 18 which have focal lengths $f_{d1}$ and $f_{d2}$, respectively.

$$1/f = (1/f_{r1} + 1/f_{d1}) + (1/f_{r2} + 1/f_{d2}) = 1/f_r + 1/f_d \qquad (1)$$

The refractive surfaces 12, 14 and DOEs 16, 18 have opto-thermal expansion coefficients $x_r$ and $x_d$, respectively, each of which is a measure of the extent to which the respective focal length ($f_r$ or $f_d$) is changed per unit of temperature change. Equation (2) below relates changes $\Delta f$, $\Delta f_r$, and $\Delta f_d$ in focal lengths f, $f_r$, and $f_d$, respectively, to a temperature change $\Delta T$.

$$\frac{\Delta f}{f} = \frac{f}{f_r}\left(\frac{\Delta f_r}{f_r}\right) + \frac{f}{f_d}\left(\frac{\Delta f_d}{f_d}\right) = \left(\frac{f}{f_r}x_r + \frac{f}{f_d}x_d\right)\Delta T \qquad (2)$$

Since lens 10 is athermalized, focal length change $\Delta f$ may be taken to be zero, to produce equation (3) which shows that in lens 10 the ratio of expansion coefficient $x_r$ to focal length $f_r$ is balanced by the ratio of expansion coefficient $x_d$ to focal length $f_d$.

$$\frac{x_r}{f_r} = -\frac{x_d}{f_d} \qquad (3)$$

Solving equations (1) and (3) simultaneously produces equations (4a) and (4b) which show that the ratio of coefficient $x_r$ to coefficient $x_d$ and its inverse define relationships between focal length f and focal lengths $f_r$ and $f_d$, respectively.

$$f_r = \left(1 - \frac{x_r}{x_d}\right)f \qquad f_d = \left(1 - \frac{x_d}{x_r}\right)f \qquad (4a, 4b)$$

For both the refractive surfaces and the DOEs, lens 10 may use polycarbonate material, for which expansion coefficients $x_r$ and $x_d$ have the following values:

$$x_r = 246(\times 10^{-6 0}C^{-1}) \qquad (4c)$$

$$x_d = 131(\times 10^{-6 0}C^{-1}) \qquad (4d)$$

Equations (5a) and (5b) below show that substituting the polycarbonate coefficient values into equations (4a) and (4b) produces a directly proportional relationship between focal length f and focal lengths $f_r$ and $f_d$, respectively.

$$f_r = \left(1 - \frac{246}{131}\right)f = -0.878f \qquad (5a)$$

$$f_d = \left(1 - \frac{131}{246}\right)f = 0.467f \qquad (5b)$$

Where lens 10 uses acrylic material, the following values and equations apply.

$$x_r = 315(\times 10^{-6 0}C^{-1}) \qquad (5c)$$

$$x_d = 129(\times 10^{-6 0}C^{-1}) \qquad (5d)$$

$$f_r = \left(1 - \frac{315}{129}\right)f = -1.442f \qquad (6a)$$

$$f_d = \left(1 - \frac{129}{315}\right)f = 0.591f \qquad (6b)$$

Thus, where the hybrid lens has positive power (i.e., has a focal length greater than zero) and uses a material (e.g., polycarbonate or acrylic) for which refractive surfaces are more sensitive to temperature changes than DOEs (i.e., the value for coefficient $x_r$ is greater than the value for coefficient $x_d$), the hybrid lens has the general shape of a lens with negative power. However, in such a lens, the positive power of the DOEs overcomes the negative power of the refractive surfaces, to produce a net positive power For the lens. In at least some cases, such a lens can use DOEs that are small relative to the size of the lens.

Figure 2A:
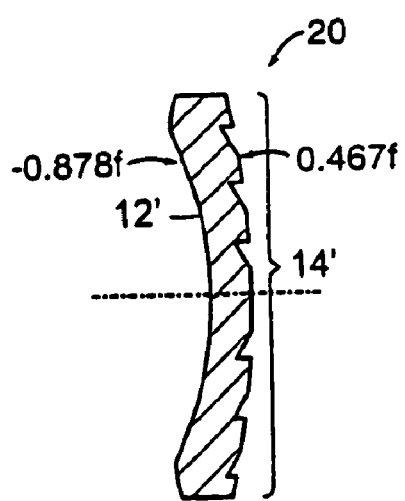
FIGS. 2a and 2b are illustrations of diffractive optical elements that are used in embodiments of the athermalized plastic lens.
Figure 2B:
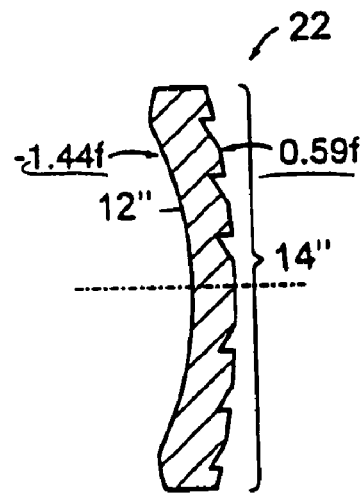

FIGS. 2A and 2B illustrate lenses 20 and 22 of polycarbonate and acrylic, respectively, which lenses are other embodiments of the hybrid lens and in each of which substantially all of the negative power of the hybrid lens is provided by one of the surfaces 12' or 12" and substantially all of the positive power is provided by another of the surfaces 14' or 14".

Figure 3:
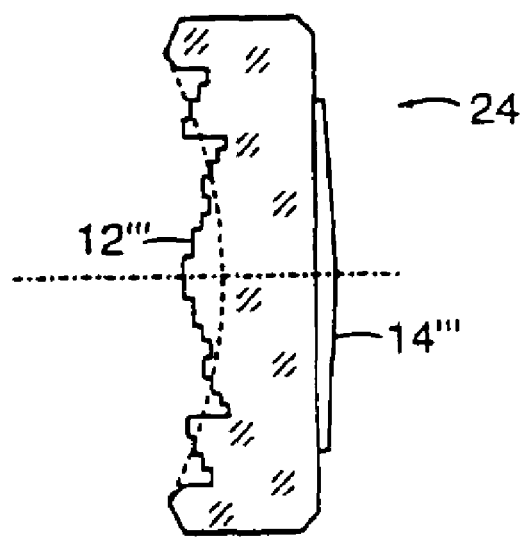
FIGS. 3 and 4 are illustrations of embodiments of the athermalized plastic lens.

FIG. 3 shows a lens 24 that is another embodiment of the hybrid lens and in which one of the surfaces 12''' provides not only substantially all of the negative power but also substantially all of the positive power, and the other surface 14''' provides no significant negative or positive power. As shown in FIG. 3, the one surface may include a DOE that is substantially spherical in average and the other surface may be substantially flat and may be used for aspherical replication.

Figure 4:
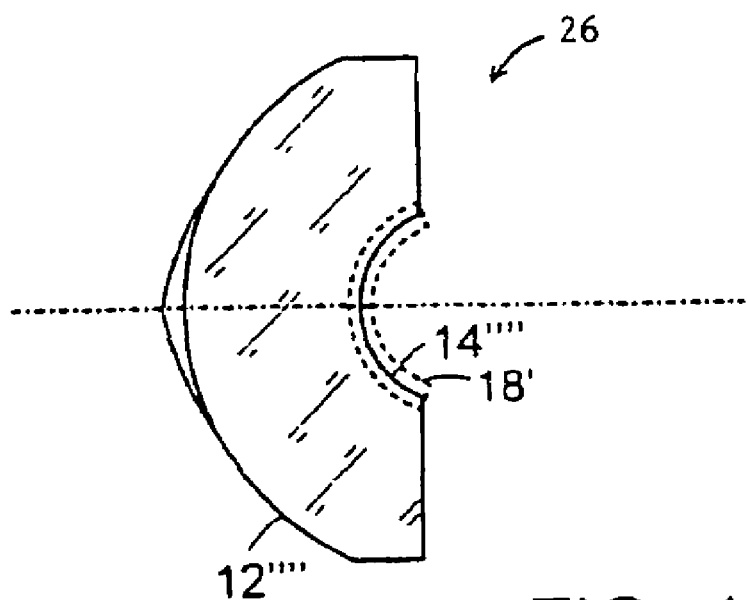

FIG. 4 shows a lens 26 that is another embodiment of the hybrid lens and in which one substantially spherical surface 12'''' provides less of the refractive power than another substantially spherical surface 14'''', and substantially all of the diffractive power is provided by a surface-relief DOE on the other substantially spherical surface 14''''. Surface 12'''' may have an aspherical surface or replica.

Where the two surfaces of the hybrid lens contribute substantially equally to the diffractive power, a size increase amounting to a factor of four may be achieved for features of the DOEs without a significant loss in resistance to optothermal changes.

In at least some cases, because acrylic requires less refractive and diffractive power than polycarbonate for the same focal length f as revealed by equations (5a), (5b), (6a), (6b) above, it may be advantageous for the hybrid lens to be constructed of acrylic material instead of polycarbonate material.

Figure 5A:
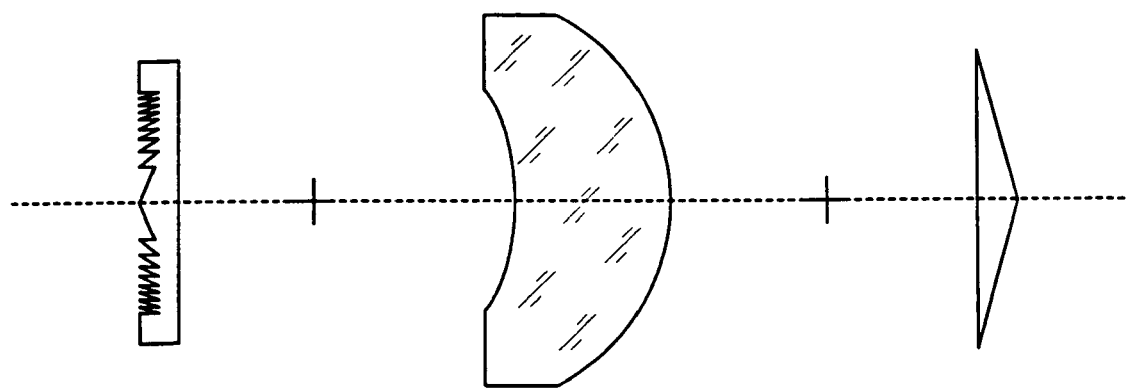
FIG. 5A is a conceptual illustration of an embodiment of the athermalized plastic lens having an axicon.
Figure 5B:
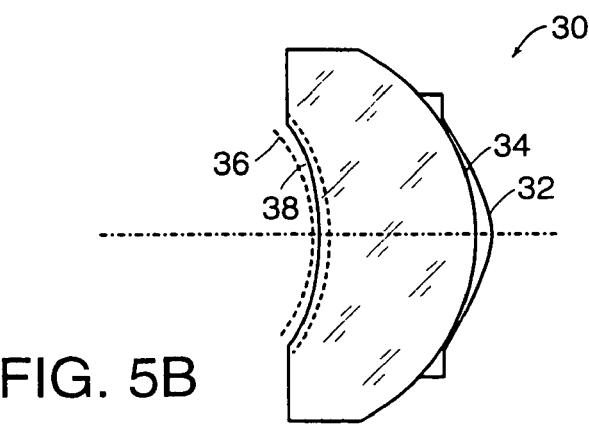
FIG. 5B is an illustration of the embodiment of FIG. 5A.

FIG. 5B shows a lens 30 that is another embodiment of the hybrid lens, which embodiment includes an aspherical mold that is pressed from a drop of polymer to form an axicon 32 on a substantially spherical surface 34 of the lens. The lens 30 also includes a DOE 36 formed in another surface 38 of the lens. FIG. 5A provides a conceptual illustration of lens 30.

Figure 6:
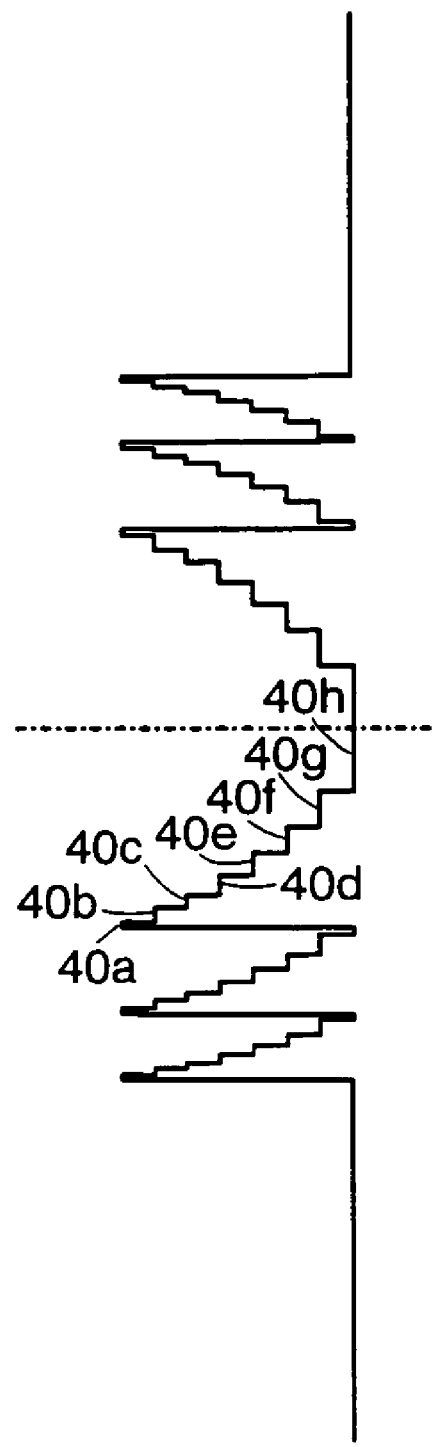
FIG. 6 is a flat-profile illustration of a diffractive optical element used in the embodiment of FIGS. 5A–5B.

The DOE 36 may have eight phase levels 40a–h as illustrated by FIG. 6 which for clarity shows DOE 36 in a flat profile, not in the actual convex profile provided in accordance with the athermal aspect of the hybrid lens as described above.

The axicon enhances the ability of the hybrid lens to focus laser beams to achieve elongated profiles advantageous for bar-code scanning, as described below.

Figure 7:
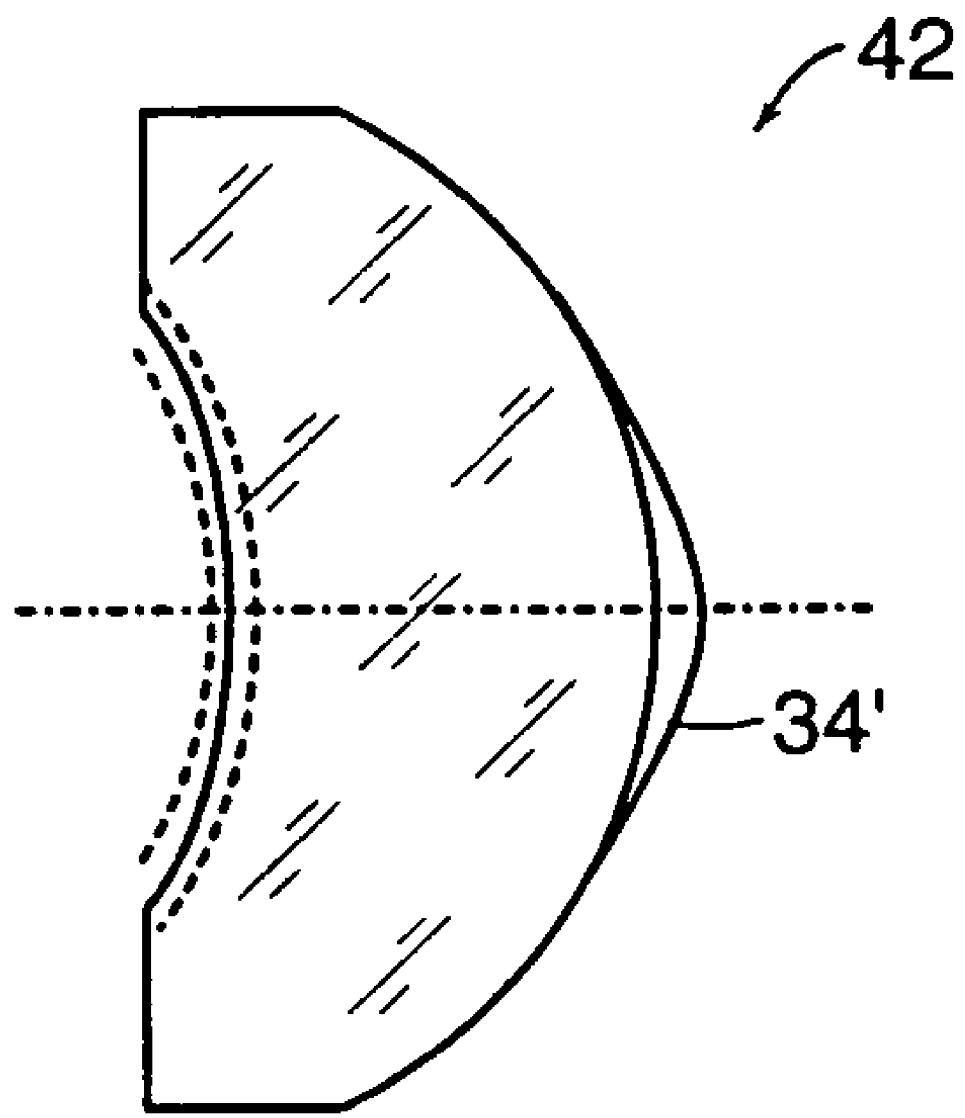
FIG. 7 is an illustration of another embodiment of the athermalized plastic lens having an axicon.

FIG. 7 shows a lens 42 that is another embodiment of the hybrid lens, which embodiment has an aspherical surface 34' that has the optical properties of surface 34 combined with axicon 32. Thus lens 42 performs similarly to lens 30 but is a single piece and therefore may be less expensive to manufacture.

Lenses 30 and 42 may be made of polycarbonate which has properties described above.

A lens-axicon combination may be particularly useful for extending the working range (e.g., by 50–100%) of a CCD-based bar code scanner. In the combination, the axicon operates as a phase correction element to allow the scanner to resolve an out-of-focus bar code that the scanner could not resolve by relying on the lens alone.

Figure 8:
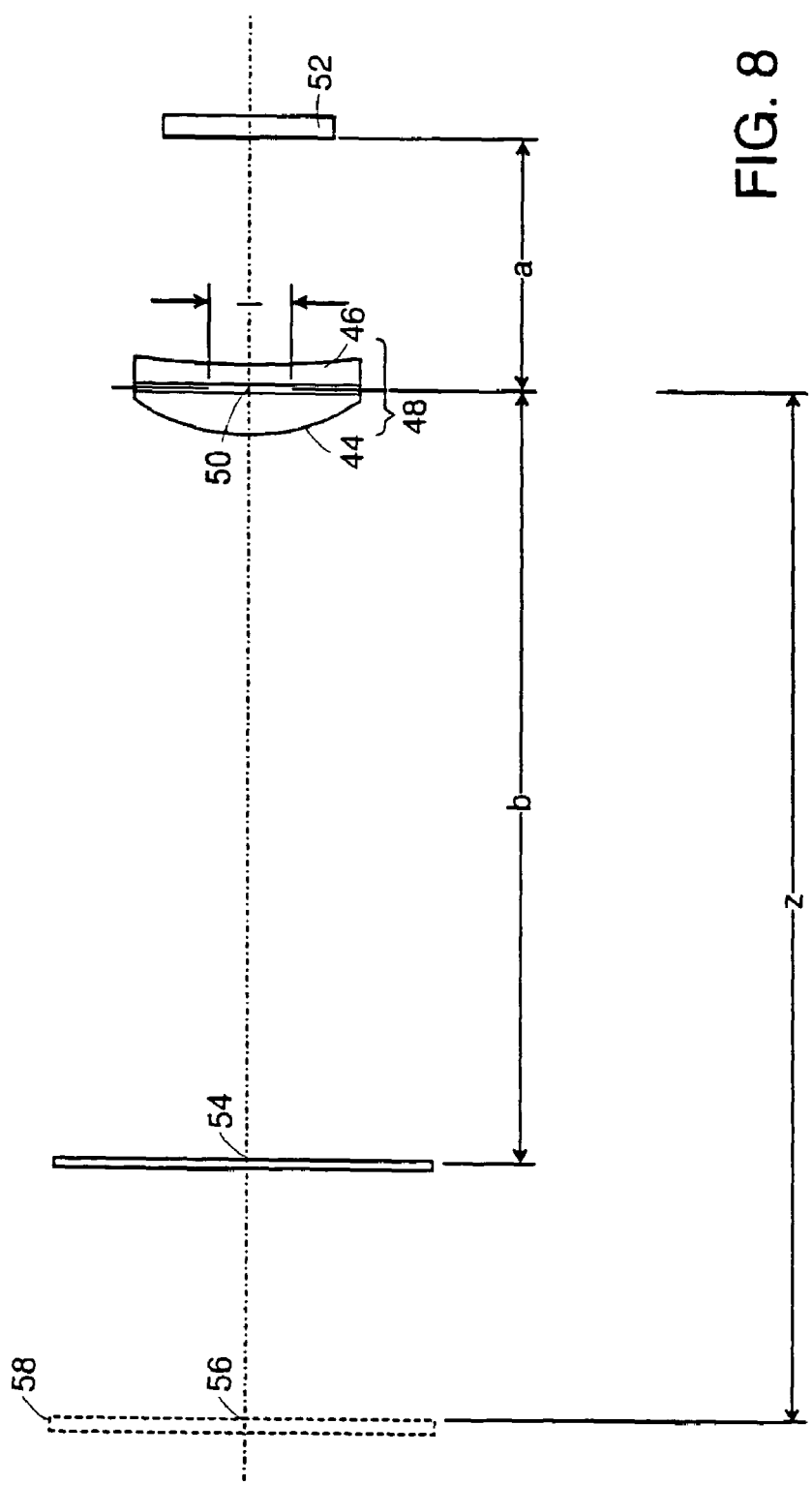
FIG. 8 is an illustration of bar code scanning using an athermalized plastic lens having an axicon.

FIG. 8 illustrates lens 44 and axicon 46 which together are an example combination 48 of the lens-axicon combination. Combination 48 has an aperture 50 that has a diameter 1 and is a distance a from a CCD imager 52 of a bar code scanner, a distance b from an in-focus point 54, and a distance z from a barcode-bearing surface 58 at a surface point 56. The lens 44 may be a doublet, a Cook triplet anastigmat or a symmetric double Gaussian, and provides optical power to bend incident light toward the imager 52. By providing a longitudinal spherical aberration, the axicon 46 effectively elongates the focal depth of the lens 44 by contributing phase correction when the surface 58 is not at the in-focus point 54. The axicon 46 has an axicon induced phase coefficient $\alpha$.

Equation (7) describes an MTF value as a function of spatial frequency v (e.g., of a bar code symbol) for a lens having an axicon that includes a circular pupil of diameter 1, and has polar coordinate values $\rho$ and $\theta$ with an origin at the pupil's center, and a normalized radial coordination value v (i.e., half of the product of $\rho$ and diameter 1), where $\lambda$ represents the wavelength and $\lambda$ represents the wave number (i.e., $2\pi$ divided by the wavelength $\lambda$).

$$MTF(v) = \frac{4}{\pi} \int_{\theta=0}^{\theta=\pi/2} d\theta \int_{r=0}^{r=-v\cos\theta+\sqrt{1-v^2\sin^2\theta}} \cos\{k[4vr\cos\theta + \alpha(\sqrt{v^2 - 2vr\cos\theta + r^2} - \sqrt{v^2 + 2vr\cos\theta + r^2})]\}rdr \quad (7)$$

Figure 9:
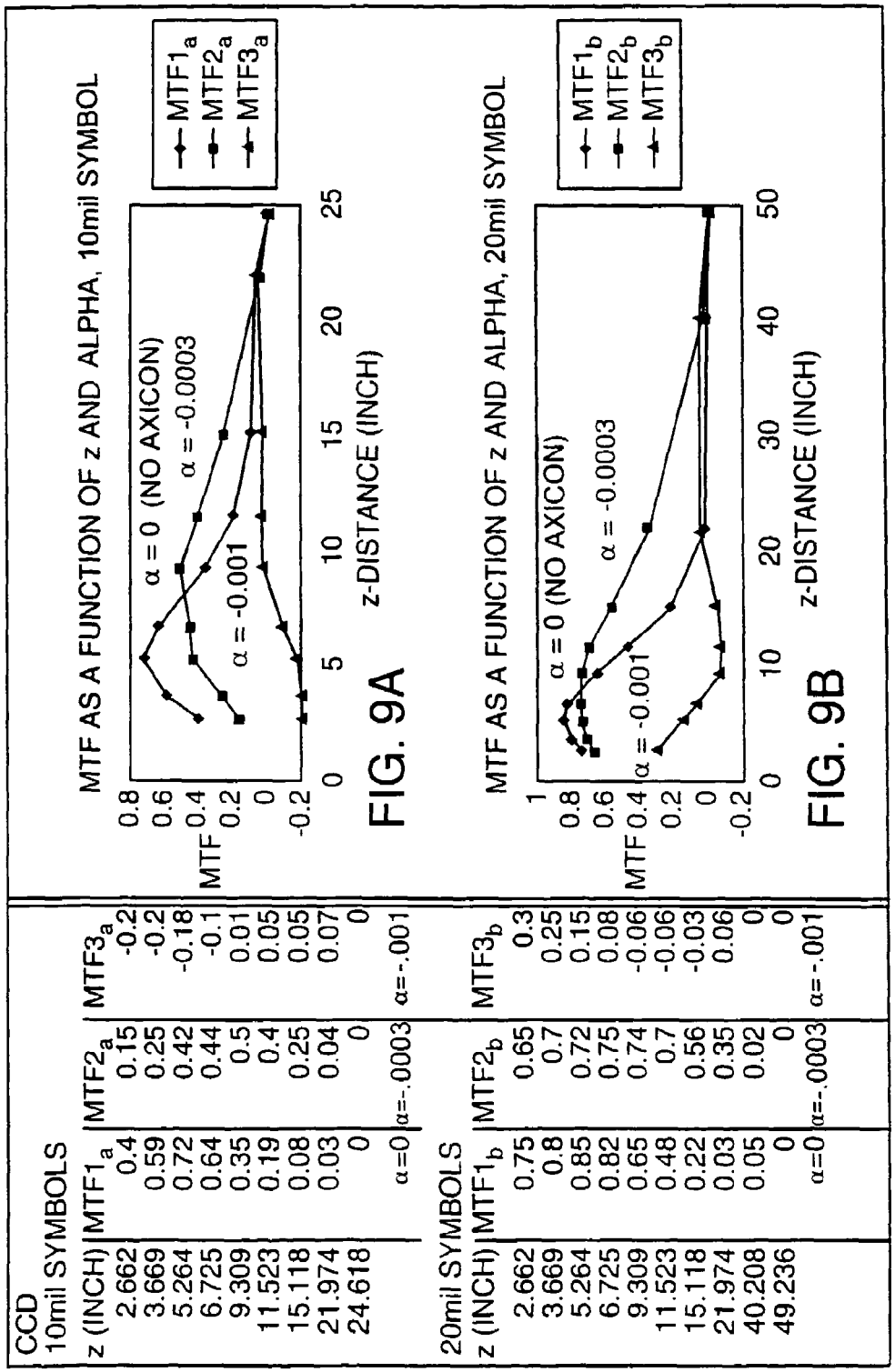
FIGS. 9A, 9B, 10A, 10B, 11A, and 11B show MTF curves for athermalized plastic lenses having different axicons.
Figure 10:
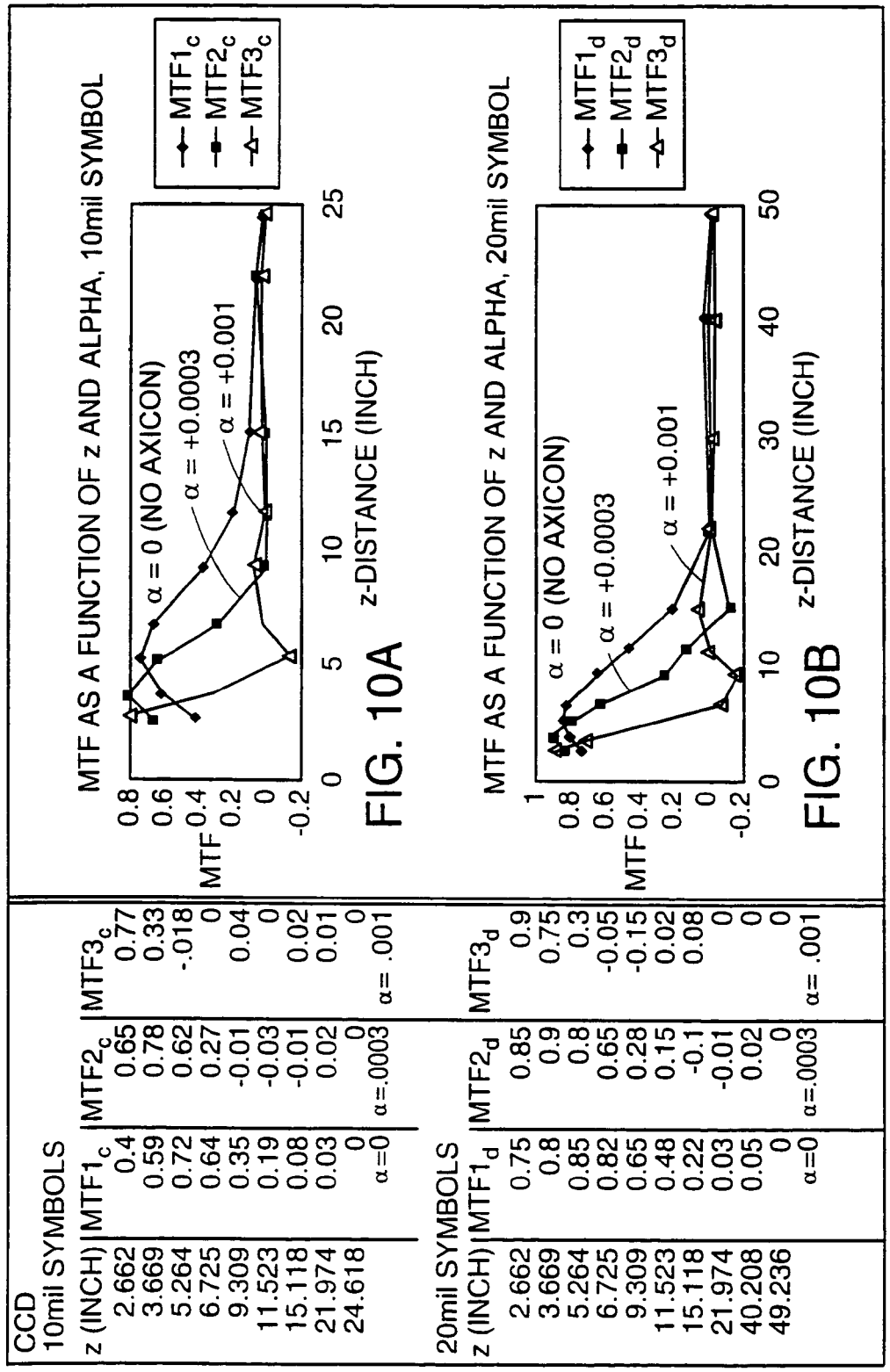
Figure 11:
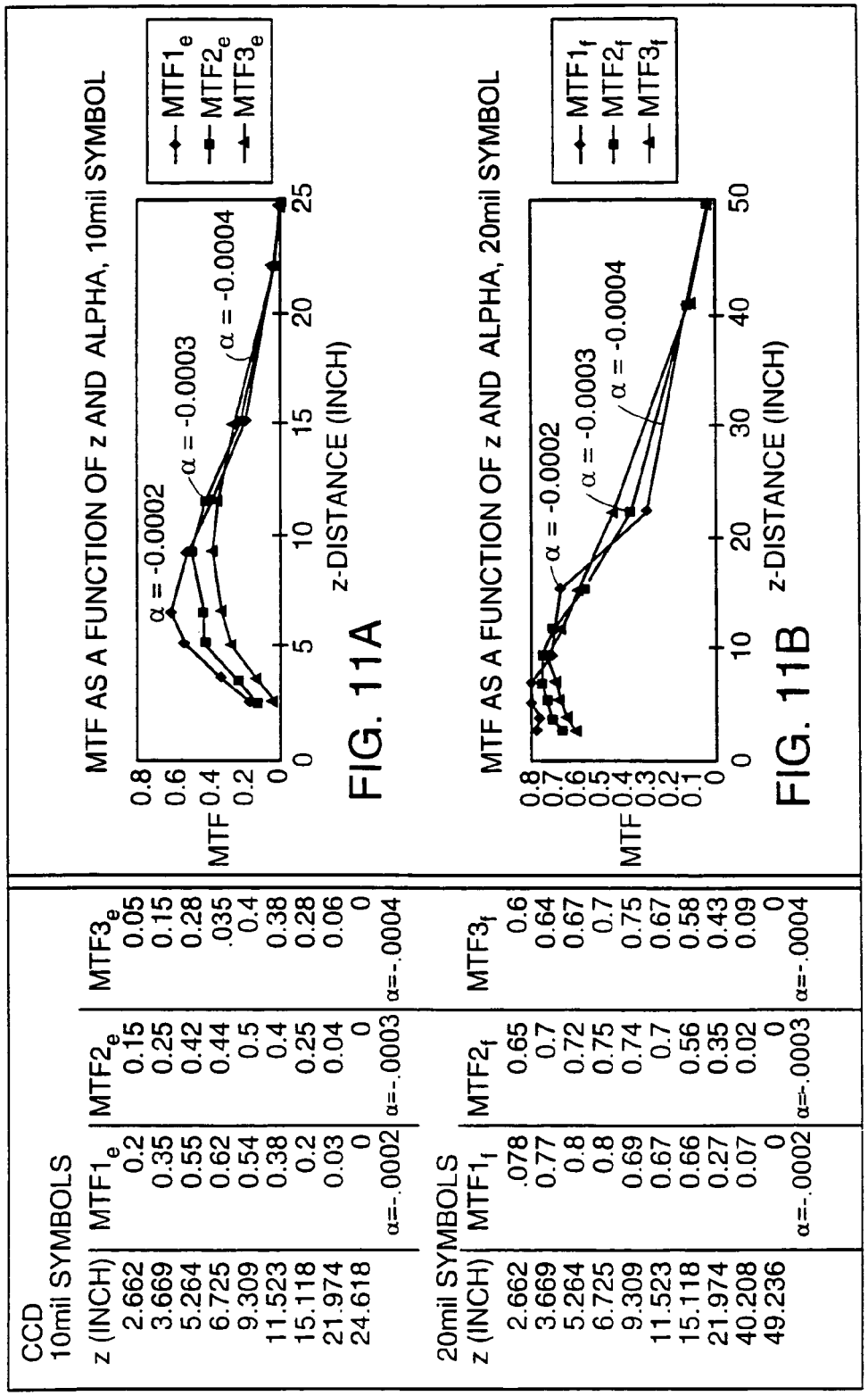

FIGS. 9A and 9B show modulation transfer function ("MTF") curves MTF1a, MTF2a, MTF3a and MTF1b, MTF2b, MTF3b, respectively, each of which describes the sharpness of an image of a bar code symbol as a function of the distance z, for a particular value (i.e., 0, −0.0003, or −0.001) for the axicon induced phase coefficient $\alpha$ and a particular spatial wavelength (i.e., 10 mil or 20 mil) of the bar code symbol. A high MTF value represents a substantially in-focus image at the imager, and an MTF value near zero represents an image that is almost completely out of focus. In general, data can be derived from an image of a bar code symbol more accurately if the image is sharper.

As shown in FIG. 9A, where the spatial wavelength is 10 mil and the axicon induced phase coefficient $\alpha$ has a value of 0 (i.e., where there is effectively no axicon), curve MTF1a shows that the MTF value peaks at about 0.75 at a z distance of about 5 inches, and remains below 0.2 for any z distance greater than 11 inches. By contrast, as shown by curve MTF2a, the use of an axicon having a value of −0.003 for the axicon induced phase coefficient $\alpha$ changes the optical characteristics of the lens-axicon combination so that the MTF value peaks at about 0.5 at a z distance of about 9.5 inches, and remains above 0.2 in a z distance range from about 4 inches to about 16 inches. Thus, for example, if data can be derived accurately from a bar code symbol image that has a sharpness corresponding to an MTF value of 0.2 or greater, for a bar code symbol having a spatial wavelength of 10 mil the axicon allows data to be derived from a distance of up to about 16 inches, which is about 5 inches further than data can be derived without the axicon.

Figure 12:
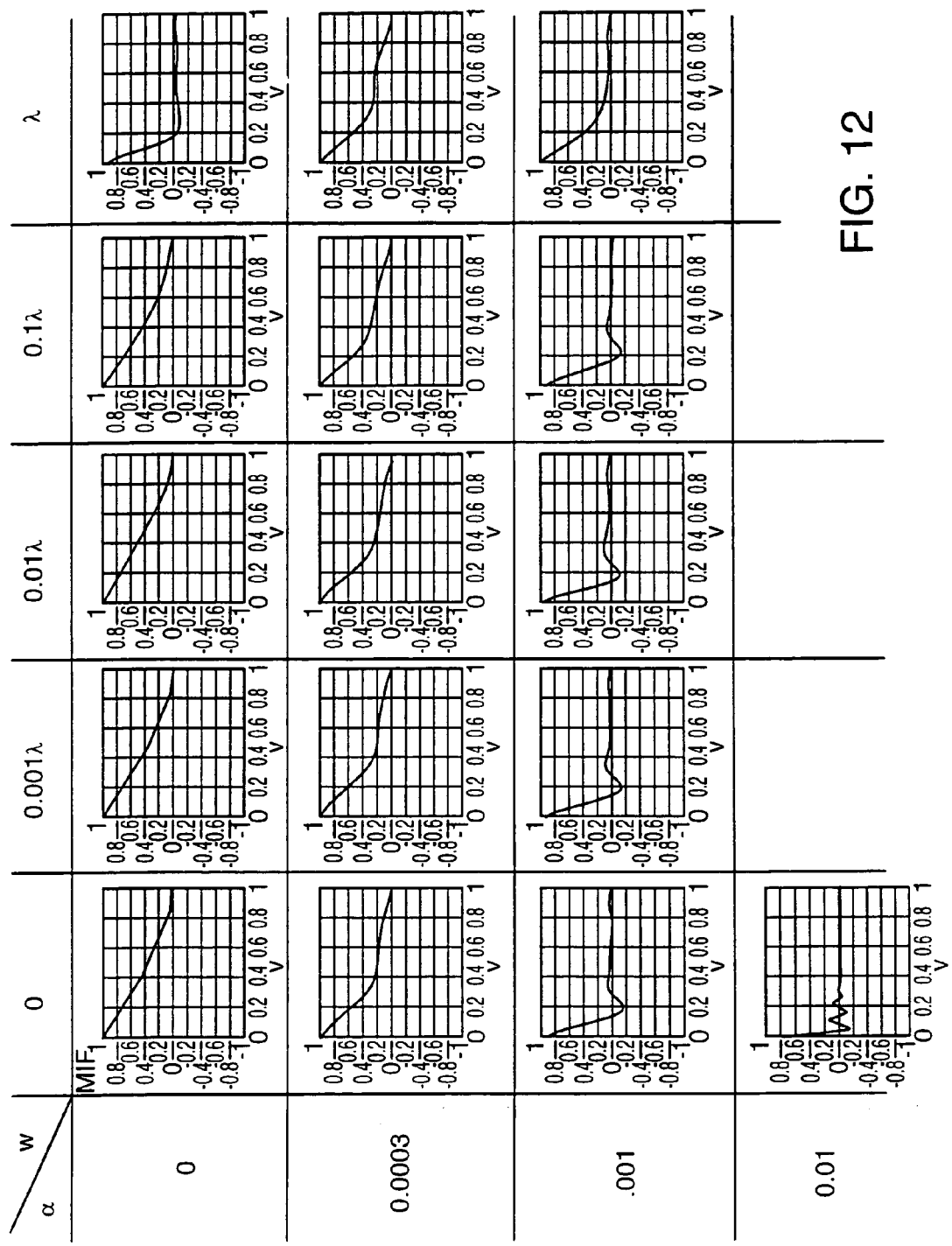
FIGS. 12 and 13 show MTF curves for different spatial wavelengths used with athermalized plastic lenses having different axicons.
Figure 13:
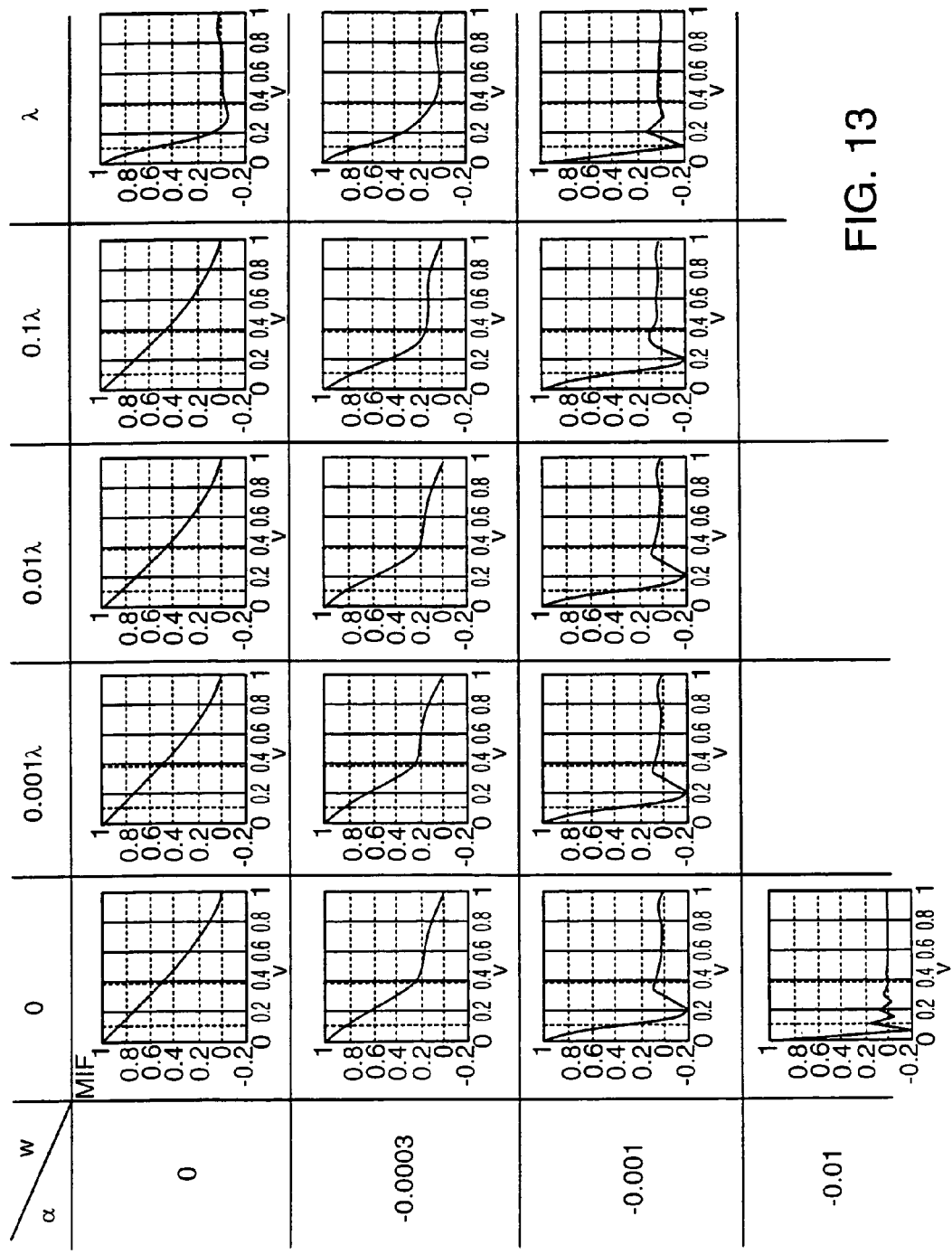

FIGS. 9A, 10A–10B, and 11A–11B illustrate MTF curves MTF1b–MTF3f for other values for the axicon induced phase coefficient $\alpha$. FIGS. 12 and 13 show other MTF curves that describe the sharpness of an image of a bar code symbol as a function of a normalized spatial wavelength v for several values for the axicon induced phase coefficient $\alpha$ and several values for focusing error w.

Other embodiments are within the scope of the following claims. For example, each lens may be formed from separate pieces (e.g., refractive lens and DOE pieces) or may be formed as a single unit. Other types of plastic may be used. In each lens, refractive or diffractive power may be distributed in any way that renders the lens substantially athermalized.

What is claimed is:

1. A plastic lens for use in a bar code scanner that acts upon light reflected from a bar code symbol, comprising:
a refractive and diffractive optical apparatus for use as a lens in the bar code scanner; the optical apparatus configured to produce optothermal changes substantially canceling each other over a predetermined working temperature range to render the plastic lens substantially athermalized over the range, and wherein the lens includes an axicon; and
wherein the axicon is configured to have an induced phase coefficient that elongates the focal depth of the lens based on an expected spatial wavelength of the bar code symbol.

2. The lens of claim 1, comprising a refractive surface and a diffractive optical element, wherein optothermal changes due to the refractive surface counter optothermal changes due to the diffractive optical element.

3. The lens of claim 1, wherein the optothermal changes canceling each other include changes affecting the focal length of the lens.

4. The lens of claim 1, comprising polycarbonate.

5. The lens of claim 1, comprising acrylic.

6. The lens of claim 1, wherein the lens has a net positive power.

7. The lens of claim 1, wherein an optothermal expansion coefficient of the refractive optical apparatus is higher than an optothermal expansion coefficient of the diffractive optical apparatus.

8. The lens of claim 1, comprising a diffractive optical element that is substantially smaller than the lens.

9. The lens of claim 1, wherein a first surface of the lens provides substantially all of the negative power of the lens, and a second surface of the lens provides substantially all of the positive power of the lens.

10. The lens of claim 1, wherein a surface of the lens provides substantially all of the negative power of the lens and substantially all of the positive power of the lens.

11. The lens of claim 1, wherein the diffractive optical apparatus includes a diffractive optical element that is substantially spherical in average.

12. The lens of claim 1, wherein a surface of the lens is substantially flat.

13. The lens of claim 1, wherein the refractive optical apparatus is divided unevenly between first and second surfaces of the lens.

14. The lens of claim 1, wherein substantially all of the diffractive optical apparatus is disposed on one surface of the lens.

15. The lens of claim 1, wherein the diffractive optical apparatus is divided substantially evenly between first and second surfaces of the lens.

16. The lens of claim 1, wherein said bar code scanner comprises a CCD-imager.

* * * * *